(12) United States Patent
Burke et al.

(10) Patent No.: US 7,741,749 B2
(45) Date of Patent: Jun. 22, 2010

(54) INNER CROSS OVER SUPPORT CLIP

(75) Inventors: David W. Burke, Oro Valley, AZ (US);
Tom Snider, Oro Valley, AZ (US);
William Scherzinger, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 12/191,558

(22) Filed: Aug. 14, 2008

(65) Prior Publication Data

US 2010/0038989 A1 Feb. 18, 2010

(51) Int. Cl.
*H02K 3/48* (2006.01)

(52) U.S. Cl. .................. 310/214; 310/71; 310/261.1

(58) Field of Classification Search ............ 310/71, 310/214, 201, 208, 270–271, 261.1
See application file for complete search history.

(56) References Cited

U.S. PATENT DOCUMENTS

| 720,307 | A | * | 2/1903 | Wood ..................... 310/271 |
| 2,899,573 | A | * | 8/1959 | Wesolowski .............. 310/60 R |
| 4,458,166 | A | * | 7/1984 | Nathenson et al. ............ 310/71 |
| 5,111,097 | A | * | 5/1992 | Londergan et al. ........... 310/179 |
| 5,191,248 | A | * | 3/1993 | Huss ....................... 310/68 D |
| 5,298,823 | A | * | 3/1994 | Johnsen ..................... 310/71 |
| 6,600,251 | B2 | | 7/2003 | Laskaris et al. |
| 6,815,860 | B2 | | 11/2004 | Wang et al. |
| 6,930,434 | B1 | | 8/2005 | Spencer et al. |
| 6,967,421 | B2 | * | 11/2005 | Gomyo et al. .............. 310/180 |
| 7,247,966 | B2 | | 7/2007 | Shore et al. |
| 7,605,505 | B2 | * | 10/2009 | Minke et al. ................. 310/71 |
| 2006/0261691 | A1 | | 11/2006 | Minke et al. |
| 2008/0143202 | A1 | | 6/2008 | Whitener et al. |

\* cited by examiner

*Primary Examiner*—Thanh Lam
(74) *Attorney, Agent, or Firm*—Oral Caglar, Esq.

(57) ABSTRACT

An inner crossover support clip may be used to support a crossover wire joining two adjacent rotor coils on a rotating machine, such as a generator. The support clip of the present invention may be capable of withstanding forces, such as centrifugal forces, that lead to the failure of conventional crossover wires. The support clip may be formed of a sheet material bent at an angle to form an inside surface thereon and may include a tie edge formed on each end of the sheet material. The tie edge attaches to adjacent rotor coils of a rotating machine and the inside surface supports a crossover wire electrically connecting the adjacent rotor coils.

18 Claims, 3 Drawing Sheets

INNER CROSS OVER SUPPORT CLIP

BACKGROUND OF THE INVENTION

The present invention relates to apparatus and methods for connecting inner crossovers together on a rotor coil and, more particularly, to a support clip for supporting a crossover connecting adjacent coils of a rotor.

A generator typically includes a shaft and rotor body supported by the shaft. The rotor body defines a number of poles, which vary in number depending on the design of the generator. For example, the speed at which the shaft rotates and frequency of electric current to be produced impact the number of poles used in the generator. In a generator, copper wire is wound along the poles on the rotor body and are referred to as the winding. In most large generators, for example, such as those used in power generation plants and other similar generator applications, the cooper wire can be formed as flat, stiff, coiled copper bars. In some cases, the copper winding is about 1 by 0.25 inches in cross-section, as one non-limiting example. These coils forming the winding are often referred to as the conductors.

The winding is designed to form a complete circuit from a first pole to the last pole. Because the winding is formed from a stiff material in these large generators, the winding ends are connected between adjacent poles with conductive jumpers known as rotor pole crossovers.

Rotor pole crossovers are designed in many shapes and sizes and change in design as the generator design requirements dictate. For example, some rotor pole crossovers have been designed as rings that encircle the shaft. Other rotor pole crossovers are designed as short crossovers in the form of flat plates or reverse S-shapes, which are oriented to lie axially relative to the rotor shaft. During generator operation, large centrifugal forces are exerted on the winding and rotor pole crossover, for example, by daily starts and stops to accommodate peak on and off electrical generation demands. As a result, the rotor pole crossovers undergo stressful duty cycles. If rotor pole crossovers lack flexibility, they crack and cause a loss in the generator electrical field.

Currently, many electrical power generators use a common method for connecting the inner crossovers together on the main rotor coils. This conventional method involves bending a flat magnet wire end of one coil 90 degrees to mate with the flat magnet wire end of the neighboring coil. The two coil ends are then resistance brazed to one another. Since the 90 degree bend is unsupported, expansion and contraction of the solid bend, caused by the variable speed of the spinning rotor's centrifugal forces, result in fatigue failure of the solid wire or the brazed joint.

A flexible crossover, as disclosed, for example, in U.S. Pat. Nos. 7,247,966 and 6,930,434, may be used to reduce the failure due to thermal cycling. The flexible crossover, however, will still be affected by centrifugal forces and, thus, may still fail to provide adequate electrical connection between coils.

As can be seen, there is a need for a rotor crossover and methods that may prevent failure of the crossover due to centrifugal forces.

SUMMARY OF THE INVENTION

In one aspect of the present invention, a support clip comprises a sheet material bent at an angle to form an inside surface thereon; a tie edge formed on each end of the sheet material, the tie edge having a width less than a width of the inside surface, wherein the tie edge attaches to adjacent rotor coils of a rotating machine; and the inside surface supports a crossover wire electrically connecting the adjacent rotor coils.

In another aspect of the present invention, a rotor comprises a first rotor coil and a second, adjacent rotor coil; a support clip positioned between the first and second rotor coils, the support clip comprising a sheet material bent at an angle to form an inside surface thereon, a tie edge formed on each end of the sheet material, the tie edge attached to the first and second rotor coils, and a tab on each end of the sheet material; and a crossover wire supported by the inside surface of the support clip.

In a further aspect of the present invention, a method for preventing failure of a crossover wire joining two adjacent rotor coils comprises supporting the crossover wire with a support clip, wherein the support clip comprising a sheet material bent at an angle to form an inside surface thereon and a tie edge formed on each end of the sheet material, the tie edge attached to the first and second rotor coils.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides an inner crossover support clip that may be used to support a crossover wire joining two adjacent rotor coils on a rotating machine, such as a generator. The support clip of the present invention may be capable of withstanding forces, such as centrifugal forces, that lead to the failure of conventional crossover wires.

Conventional crossover wires, including flexible crossover wires that are known in the art as an improvement over rigid crossover wires, may be subject to varying centrifugal forces acting on the crossover wire, caused by the varying speed of the rotating machine. These crossover wires are typically brazed to the ends of each of the adjacent coil wires. The centrifugal forces acting on the crossover wires may cause the brazed joint between the crossover wires and the coil wires to fail, resulting in an open circuit.

The inner crossover support of the present invention may reduce or eliminate the failure of the brazed joint between the crossover wire and the coil wire. The inner crossover support of the present invention may support the crossover wire and absorb the centrifugal forces acting on the crossover wire when the rotating machine is operating. The present invention may be useful in any rotating machine for supporting the crossover wire between two adjacent coils. For example, electrical power systems, such as electrical generators and electrical motors, may be improved with the inner crossover support of the present invention.

Figure 1:
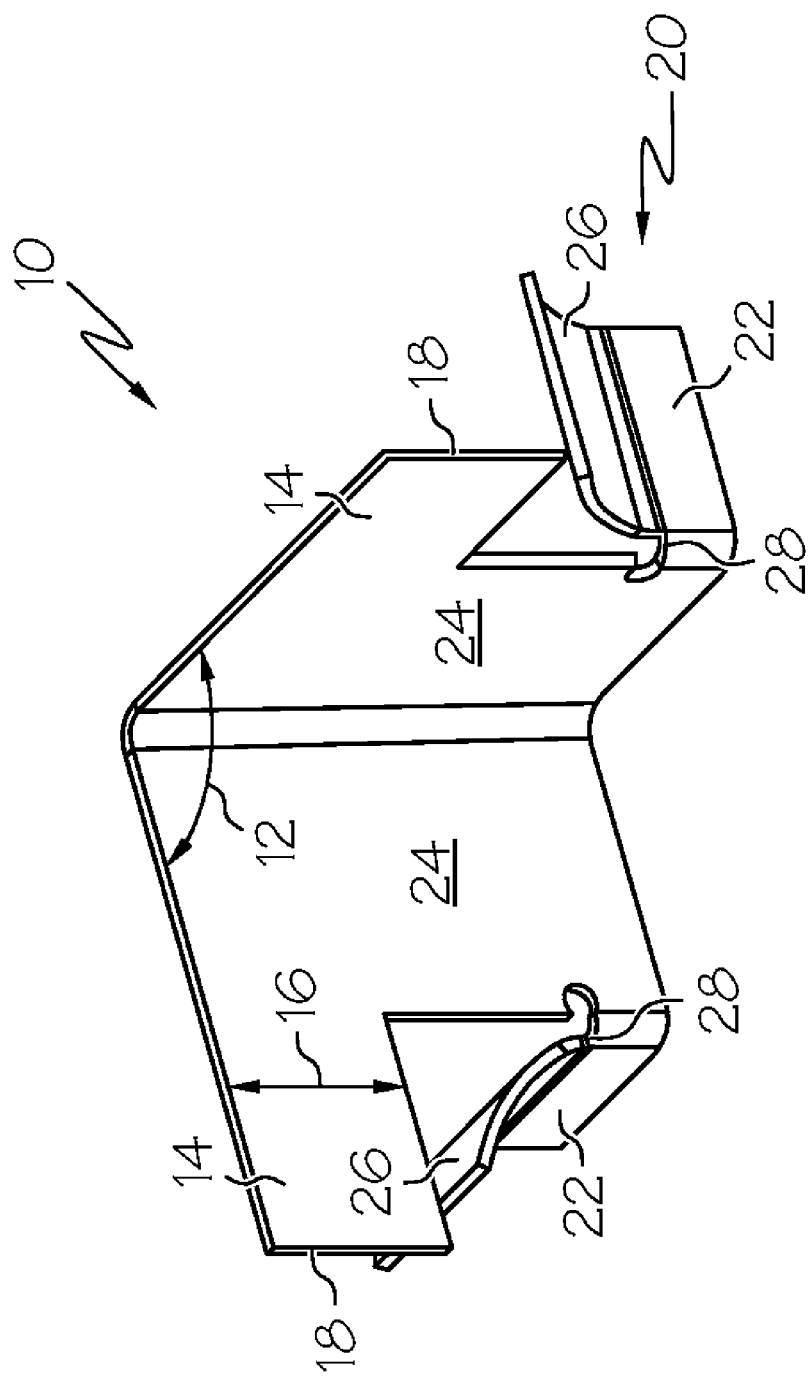
FIG. 1 is a perspective view of an inner crossover support clip according to the present invention.

Referring to FIG. 1, there is shown a perspective view of an inner crossover support clip 10 according to the present invention. The inner crossover support clip 10 (also referred to as simply support clip 10) may be formed of a sheet material bent an angle 12. The sheet material may be any material stable under the operating conditions of a rotor (not shown). For example the sheet material may be copper, beryllium copper, a copper alloy containing nickel or cobalt, or the like. The sheet material may be bent with the angle 12 being from about 70 to about 110 degrees, typically about 90 degrees.

The support clip 10 may include tie edges 14 having a suitable width 16 for tying into ends of adjacent coils, as described further below with reference to FIG. 2. The tie ends 14 may be formed on each end 18 of the support clip 10. The width 16 may be greater than the width of the crossover wire (described below with reference to FIG. 2).

The support clip 10 may further include tabs 20 for supporting the support clip 10 when installed in a rotor, as described in greater detail below. The tabs 20 may include a flat portion 22 being bent away from an inside surface 24 of the support clip 10. Typically, the flat portion 22 may define a surface that is orthogonal to the inside surface 24 of the support clip 10. An arced portion 26 of the tab 20 may be formed on a top portion 28 of the flat portion 22 as shown in FIG. 1. The support clip 10 may be formed from a flat sheet of sheet material. This flat sheet may be cut and bent to form the desired shape, such as that shown in FIG. 1. Optionally, the support clip 10 may be formed from one or more pieces joined together by methods known in the art.

Figure 2:
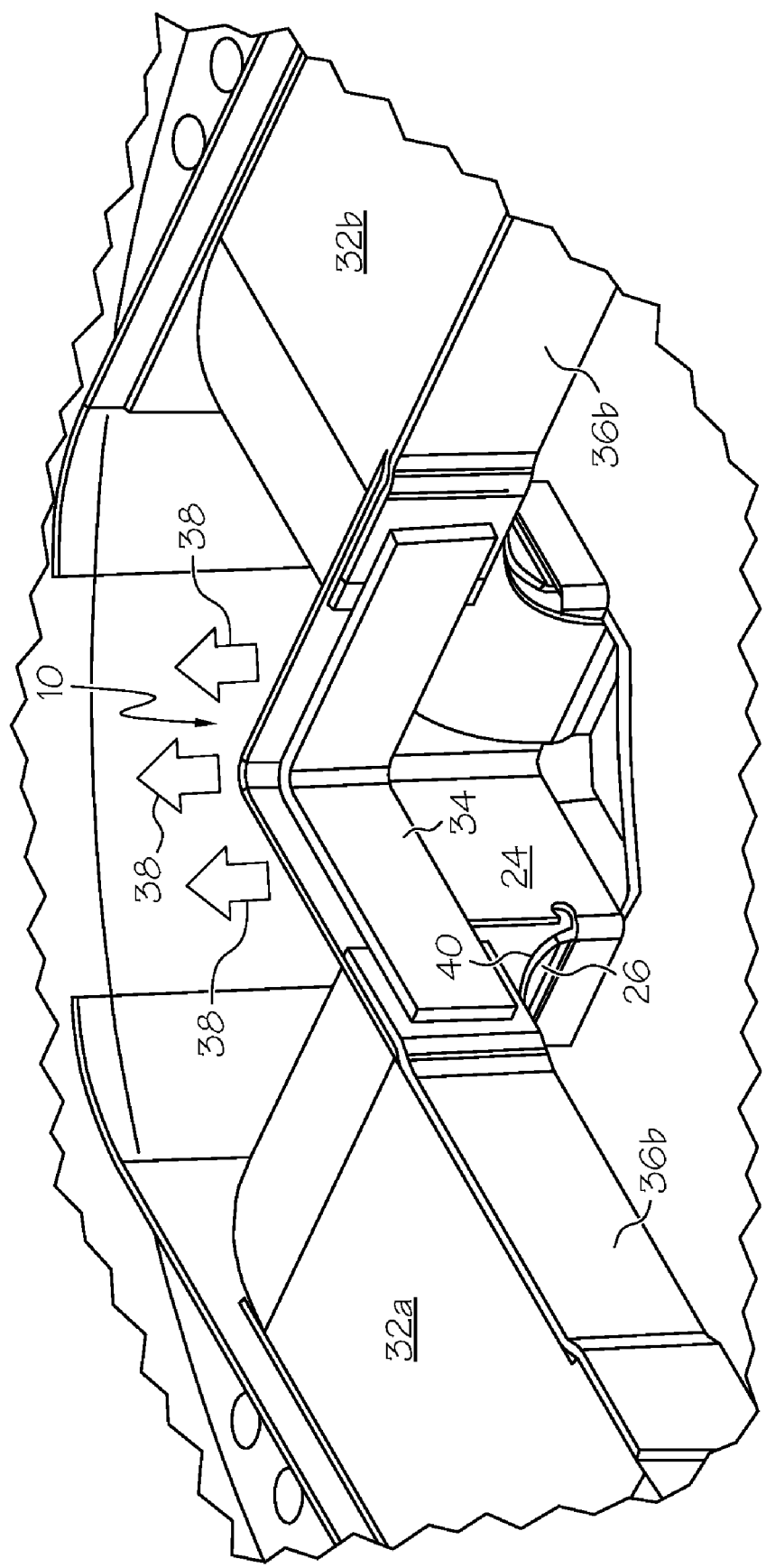
FIG. 2 is a perspective view of the inner crossover support clip of FIG. 1 installed in a rotor.

Referring now to FIG. 2, the support clip 10 of FIG. 1 may be installed in a rotor 30 of a rotating machine. The rotor 30 may include rotor coils 32a and 32b being linked with a crossover wire 34. The crossover wire 34 may be brazed to inner crossover leads 36a, 36b of each of the rotor coils 32a, 32b. The crossover wire 34 may be formed of any material typically used for crossover wires in the art, such as tin cobalt copper, silver plated copper and the like.

The tie edges 14 of the support clip 10 may be installed under the inner crossover leads 36a, 36b, as shown in FIG. 2. Once installed between adjacent rotor coils 32a, 32b, the support clip 10 may be kept in place by its placement under the conductors 36b with the tabs of the arced portion 26. The support clip 10 may be covered in a non-conductive material prior to installation.

The inner surface 24 of the support clip 10 may absorb centrifugal forces (as shown by arrows 38) that act on the crossover wire 34 when the rotor 30 is rotating. The arc-ed portion 26 of the tab 20 may utilize the geometry of the magnet wire coil layers (not shown) for support. In other words, the arc-ed portion 26 may have its outer surface 40 about the wire coil layers of each of the rotor coils 32a, 32b.

Figure 3:
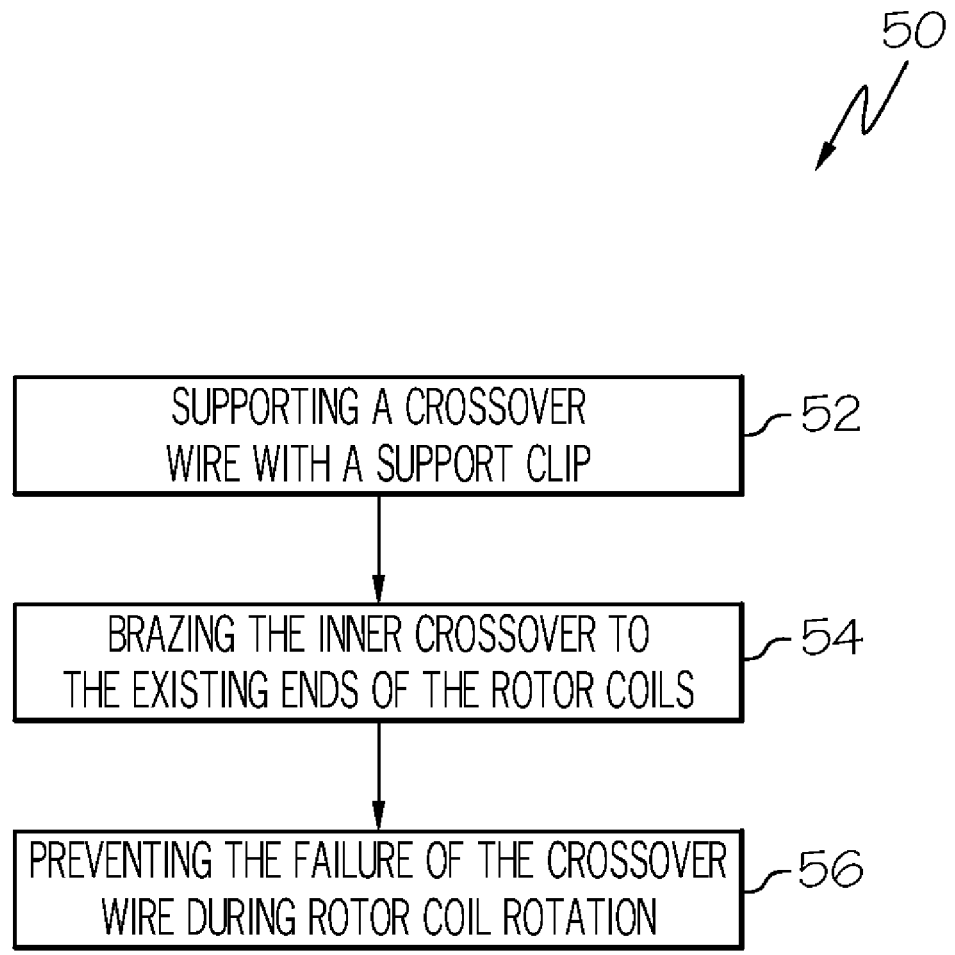
FIG. 3 describes a method for preventing failure of a crossover wire joining two adjacent rotor coils, according to the present invention.

Referring to FIG. 3, there is shown a method 50 for preventing failure of a crossover wire (e.g., crossover wire 34) joining two adjacent rotor coils (e.g., rotor coils 32a, 32b). The method 50 may include a step 52 of supporting the crossover wire with a support clip (e.g., support clip 10). The method 50 may optionally include a step 54 of brazing the inner crossover to the existing ends of the rotor coils. The result of the method, at step 56, may be the prevention of the failure of the crossover wire during rotation of the rotor coils.

It should be understood, of course, that the foregoing relates to exemplary embodiments of the invention and that modifications may be made without departing from the spirit and scope of the invention as set forth in the following claims.

We claim:

1. A support clip comprising:
   a sheet material bent at an angle to form an inside surface thereon;
   a tie edge formed on each end of the sheet material, the tie edge having a width less than a width of the inside surface, wherein
   the tie edge attaches to adjacent rotor coils of a rotating machine; and
   the inside surface supports a crossover wire electrically connecting the adjacent rotor coils.

2. The support clip of claim 1, further comprising a tab on each end of the sheet material, the tab supporting the support clip in place when installed between two adjacent rotor coils.

3. The support clip of claim 1, wherein the angle is in the range of 70 to 110 degrees.

4. The support clip of claim 3, wherein the angle is about 90 degrees.

5. The support clip of claim 1, wherein the width of the tie edge is greater than a width of the crossover wire.

6. The support clip of claim 2, wherein each tab is orthogonal to the inside surface.

7. The support clip of claim 2, wherein each tab includes a flat surface portion and an arc-ed portion, the arc-ed portion fitting against the rotor coil when the support clip is installed.

8. The support clip of claim 2, wherein the entire support clip is integrally formed.

9. A rotor comprising:
   a first rotor coil and a second, adjacent rotor coil;
   a support clip positioned between the first and second rotor coils, the support clip comprising a sheet material bent at an angle to form an inside surface thereon, a tie edge formed on each end of the sheet material, the tie edge attached to the first and second rotor coils, and a tab on each end of the sheet material; and
   a crossover wire supported by the inside surface of the support clip.

10. The rotor of claim 9, wherein the support clip is formed of beryllium copper.

11. The rotor of claim 9, wherein the angle is about 90 degrees and each tab has a flat portion orthogonal to the inside surface of the support clip.

12. The rotor of claim 9, wherein the tie ends are brazed to the first and second rotor coils.

13. The rotor of claim 9, wherein each tab includes a flat surface portion and an arced portion, the arced portion fitting against the rotor coil when the support clip is installed.

14. A method for preventing failure of a crossover wire joining two adjacent rotor coils, the method comprising supporting the crossover wire with a support clip, wherein the support clip comprising a sheet material bent at an angle to form an inside surface thereon and a tie edge formed on each end of the sheet material, the tie edge attached to the first and second rotor coils.

15. The method of claim 14, further comprising supporting the support clip in place between the adjacent rotor coils with a tab formed on each end of the support clip.

16. The method of claim 15, further comprising forming the tab with a flat surface portion and an arced portion, the arced portion fitting against each of the adjacent rotor coils when the support clip is installed.

17. The method of claim 14, further comprising brazing crossover wire to existing ends of the adjacent rotor coils.

18. The method of claim 14, further comprising:
rotating the adjacent rotor coils in a rotating machine; and
absorbing the centrifugal forces acting on the crossover wire with the inside surface of the support clip.

* * * * *